United States Patent
Tvila et al.

(10) Patent No.: US 10,452,400 B2
(45) Date of Patent: Oct. 22, 2019

(54) MULTI-THREAD PROCESSOR WITH MULTI-BANK BRANCH-TARGET BUFFER

(71) Applicant: Centipede Semi Ltd., Netanya (IL)

(72) Inventors: Avishai Tvila, Givat Shmuel (IL); Alberto Mandler, Zichron Yaakov (IL)

(73) Assignee: CENTIPEDE SEMI LTD., Netanya (IL)

( * ) Notice: Subject to any disclaimer, the term of this patent is extended or adjusted under 35 U.S.C. 154(b) by 47 days.

(21) Appl. No.: 15/904,474

(22) Filed: Feb. 26, 2018

(65) Prior Publication Data

US 2019/0265977 A1  Aug. 29, 2019

(51) Int. Cl.
*G06F 9/38* (2018.01)
*G06F 9/30* (2018.01)

(52) U.S. Cl.
CPC ........ *G06F 9/3806* (2013.01); *G06F 9/30058* (2013.01); *G06F 9/3867* (2013.01)

(58) Field of Classification Search
None
See application file for complete search history.

(56) References Cited

U.S. PATENT DOCUMENTS

| | | | |
|---|---|---|---|
| 6,029,228 A * | 2/2000 | Cai | G06F 9/30174 711/137 |
| 9,208,066 B1 | 3/2015 | Mizrahi et al. | |
| 9,135,015 B1 | 9/2015 | Mizrahi et al. | |
| 9,348,595 B1 | 5/2016 | Mizrahi et al. | |
| 9,430,244 B1 | 8/2016 | Tennenhaus et al. | |
| 9,715,390 B2 | 7/2017 | Mizrahi et al. | |
| 9,858,075 B2 | 1/2018 | Tennenhaus et al. | |
| 2002/0078332 A1* | 6/2002 | Seznec | G06F 9/3806 712/240 |
| 2016/0291979 A1* | 10/2016 | Mizrahi | G06F 9/3838 |
| 2016/0291982 A1 | 10/2016 | Mizrahi et al. | |
| 2017/0010892 A1 | 1/2017 | Mizrahi et al. | |
| 2018/0004627 A1 | 1/2018 | Koren et al. | |

* cited by examiner

Primary Examiner — William B Partridge
(74) Attorney, Agent, or Firm — Kligler & Associates

(57) ABSTRACT

A processor includes a pipeline and a multi-bank Branch-Target Buffer (BTB). The pipeline is configured to process program instructions including branch instructions. The multi-bank BTB includes a plurality of BTB banks and is configured to store learned Target Addresses (TAs) of one or more of the branch instructions in the plurality of the BTB banks, to receive from the pipeline simultaneous requests to retrieve respective TAs, and to respond to the requests using the plurality of the BTB banks in the same clock cycle.

22 Claims, 2 Drawing Sheets

MULTI-THREAD PROCESSOR WITH MULTI-BANK BRANCH-TARGET BUFFER

FIELD OF THE INVENTION

The present invention relates generally to processor design, and particularly to processors having multi-bank branch-target buffers.

BACKGROUND OF THE INVENTION

Some processors store learned Target Addresses (TAs) of previously-encountered branch instructions in a Branch-Target Buffer (BTB). The BTB is used for efficient processing of subsequent occurrences of such branch instructions.

SUMMARY OF THE INVENTION

An embodiment of the present invention that is described herein provides a processor including a pipeline and a multi-bank Branch-Target Buffer (BTB). The pipeline is configured to process program instructions including branch instructions. The multi-bank BTB includes a plurality of BTB banks and is configured to store learned Target Addresses (TAs) of one or more of the branch instructions in the plurality of the BTB banks, to receive from the pipeline simultaneous requests to retrieve respective TAs, and to respond to the requests using the plurality of the BTB banks in the same clock cycle.

In some embodiments, the pipeline includes multiple hardware threads, and the multi-bank BTB is configured to receive the simultaneous requests from two or more of the hardware threads.

In some embodiments, the multi-bank BTB is configured to (i) detect that two or more of the requests pertain to the same BTB bank, (ii) arbitrate between the requests that access the same BTB bank, so as to select a winning request, (iii) retrieve a TA from the same BTB bank in response to the winning request, and (iv) provide the retrieved TA to a hardware thread that issued the winning request. In an embodiment, the multi-bank BTB is configured to multicast the retrieved TA to the hardware thread that issued the winning request, and to at least one other hardware thread that did not issue the winning request. In an embodiment, the requests that access the same BTB bank pertain to at least two different software threads.

In other embodiments, the multi-bank BTB includes a read buffer, which is configured to store one or more TAs that were previously retrieved from at least one of the BTB banks, and the multi-bank BTB is configured to serve one or more of the requests from the read buffer instead of from the BTB banks. In an embodiment, the multi-bank BTB is configured to attempt serving a request from the read buffer, in response to the request losing arbitration for access to the BTB banks. In another embodiment, the multi-bank BTB is configured to initially attempt serving a request from the read buffer, and, in response to failing to serve the request from the read buffer, to serve the request from at least one of the BTB banks. In yet another embodiment, the multi-bank BTB is configured to attempt serving a request from the read buffer, and, at least partially in parallel, to attempt serving the request from the BTB banks.

In a disclosed embodiment, a given hardware thread is configured to issue a request to the multi-bank BTB only if the given hardware thread is not stalled for more than a predefined number of clock cycles. In an example embodiment, when a given hardware thread is stalled but nevertheless issues a request to the multi-bank BTB, the given hardware thread is configured to store a TA that was returned in response to the request, and to subsequently access the stored TA instead of accessing the BTB banks. In still another embodiment, when a given hardware thread is stalled, the given hardware thread is configured to delay access to the multi-bank BTB.

There is additionally provided, in accordance with an embodiment of the present invention, a method including, in a processor, processing program instructions, including branch instructions, using a pipeline. Learned Target Addresses (TAs) of one or more of the branch instructions are stored in a multi-bank Branch-Target Buffer (BTB) that includes a plurality of BTB banks. Simultaneous requests to retrieve respective TAs are received from the pipeline. The requests are responded to using the plurality of the BTB banks in the same clock cycle.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and apparatus for storing and using previously-learned Target Addresses (TAs) of branch instructions in a processor. In particular, disclosed embodiments provide multi-bank Branch-Target Buffers (BTBs) that enable multiple hardware threads to retrieve TAs in the same clock cycle.

In some embodiments, a processor comprises a processing pipeline comprising multiple hardware threads, and a multi-bank BTB comprising a plurality of BTB banks. Each BTB bank typically comprises a single-port memory that supports one read operation per clock cycle. Each BTB bank holds multiple BTB entries, each BTB entry comprising a TA corresponding to a respective Program Counter (PC) value. Each BTB bank is typically assigned a respective sub-range of the possible PC values, e.g., by using a subset of the PC bits as a "bank select" signal. Any suitable subset of bits can be used for this purpose.

The multi-bank BTB is configured to receive from two or more of the hardware threads simultaneous requests to retrieve respective TAs, and to respond to the requests using the plurality of the BTB banks in the same clock cycle. Each request specifies a PC value of a branch instruction for which the TA is requested. As long as the PC values in the requests are mapped to different BTB banks, no collision occurs, and the multi-bank BTB serves each request by accessing the respective BTB bank. If two (or more) requests specify PC values that are mapped to the same BTB bank, arbitration logic in the multi-bank BTB selects which of the requests will be served. The other request or requests are deferred to a later clock cycle.

In some embodiments, the multi-bank BTB employs additional measures for reducing the probability of collision, or for reducing the impact of collision on the requesting hardware threads. For example, when serving a BTB entry to a thread that won the arbitration, the multi-bank BTB may distribute ("multi-cast") the BTB entry to one or more other threads that lost the arbitration, as well. As another example, in some embodiments the multi-bank BTB comprises an additional read buffer, which caches recently-accessed BTB entries. The multi-bank BTB may serve a request from the read buffer, for example, when the request loses arbitration, or in parallel with attempting to access the BTB banks.

The disclosed multi-bank BTB configurations provide a highly-efficient means of buffering TAs for concurrent use by multiple hardware threads. The disclosed techniques perform well in scenarios that are prone to collision, e.g., when multiple hardware threads process different iterations of the same program loop in parallel. Other use-cases include multiple different programs or software threads that run on the same processor.

System Description

Figure 1:
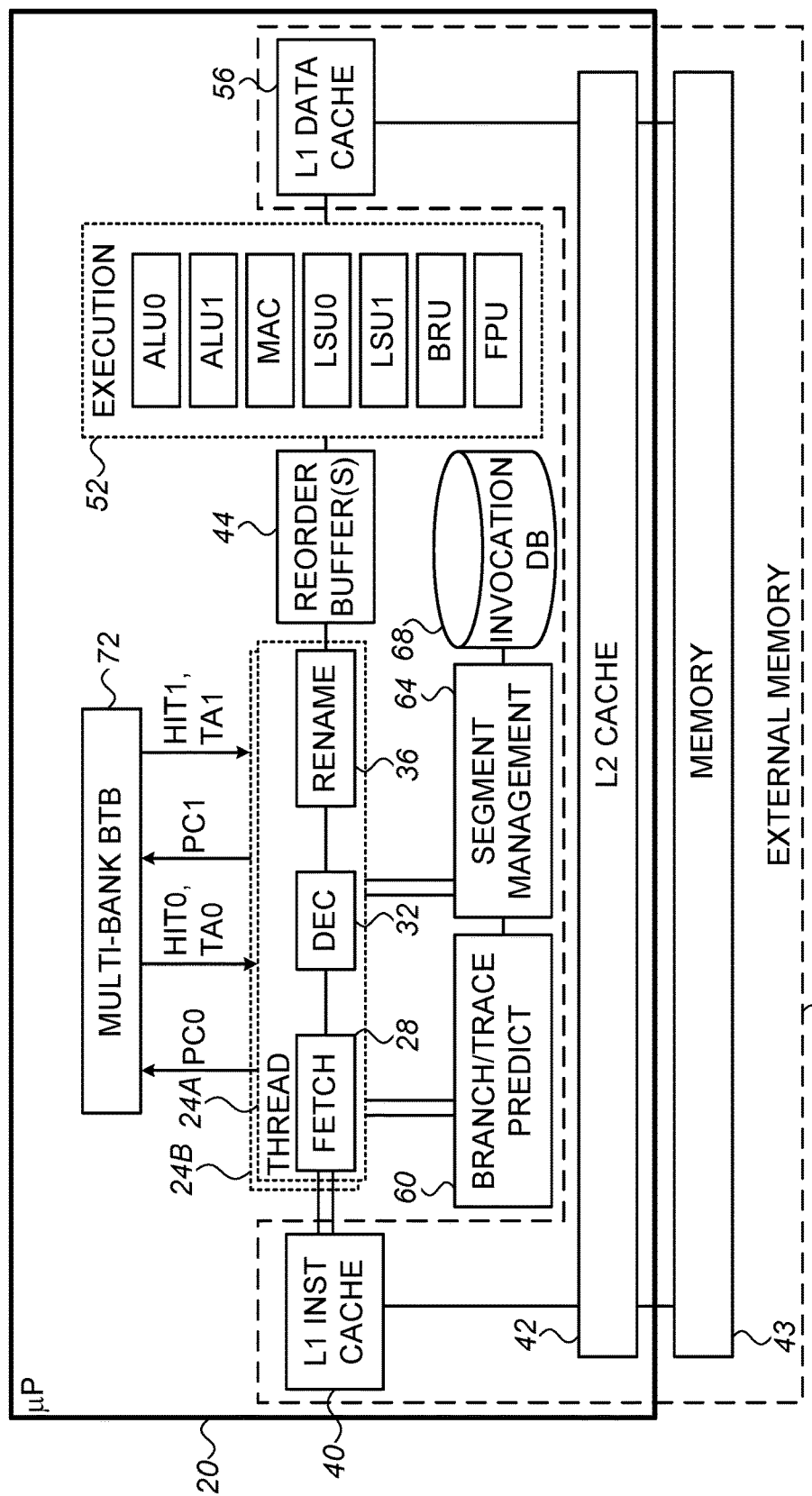
FIG. 1 is a block diagram that schematically illustrates a processor comprising multiple hardware threads and a multi-bank BTB, in accordance with an embodiment of the present invention.

FIG. 1 is a block diagram that schematically illustrates a processor 20, in accordance with an embodiment of the present invention. Processor 20 comprises multiple hardware threads 24 that are configured to operate in parallel. In the present example the processor comprises two hardware threads denoted 24A (also referred to as THREAD#0) and 24B (also referred to as THREAD#1). Generally, however, processor 20 may comprise any suitable number of threads.

In the example of FIG. 1, each thread 24 is configured to process one or more respective segments of the code. Certain aspects of thread parallelization are addressed, for example, in U.S. patent application Ser. Nos. 14/578,516, 14/578,518, 14/583,119, 14/637,418, 14/673,884, 14/673,889, 14/690,424, 14/794,835, 14/924,833, 14/960,385 and 15/196,071, which are all assigned to the assignee of the present patent application and whose disclosures are incorporated herein by reference.

In some embodiments, each hardware thread 24 comprises a fetching module 28, a decoding module 32 and a renaming module 36. Fetching modules 24 fetch the program instructions of their respective code segments from a memory, e.g., from a multi-level instruction cache. In the present example, processor 20 comprises a memory system 41 for storing instructions and data. Memory system 41 comprises a multi-level instruction cache comprising a Level-1 (L1) instruction cache 40 and a Level-2 (L2) cache 42 that cache instructions stored in a memory 43.

In a given thread 24, the fetched instructions are provided from the output of fetching module 28 to decoding module 32. Decoding module 32 decodes the fetched instructions. The decoded instructions provided by decoding module 32 are typically specified in terms of architectural registers of the processor's instruction set architecture. The decoded instructions are provided to renaming module 36, which carries out register renaming.

Processor 20 comprises a register file that comprises multiple physical registers. The renaming modules of the various hardware threads associate each architectural register in the decoded instructions to a respective physical register in the register file (typically allocates new physical registers for destination registers, and maps operands to existing physical registers).

The renamed instructions (e.g., the micro-ops/instructions output by renaming modules 36) are buffered in-order in one or more Reorder Buffers (ROB) 44, also referred to as Out-of-Order (OOO) buffers. In alternative embodiments, one or more instruction queue buffers are used instead of ROB. The buffered instructions are pending for out-of-order execution by multiple execution modules 52, i.e., not in the order in which they have been fetched. In alternative embodiments, the disclosed techniques can also be implemented in a processor that executes the instructions in-order.

The renamed instructions buffered in ROB 44 are scheduled for execution by the various execution units 52. Instruction parallelization is typically achieved by issuing one or multiple (possibly out of order) renamed instructions/micro-ops to the various execution units at the same time. In the present example, execution units 52 comprise two Arithmetic Logic Units (ALU) denoted ALU0 and ALU1, a Multiply-Accumulate (MAC) unit, two Load-Store Units (LSU) denoted LSU0 and LSU1, a Branch execution Unit (BRU) and a Floating-Point Unit (FPU). In alternative embodiments, execution units 52 may comprise any other suitable types of execution units, and/or any other suitable number of execution units of each type. The cascaded structure of threads 24 (including fetch modules 28, decoding modules 32 and renaming modules 36), ROB 44 and execution units 52 is referred to herein as the pipeline of processor 20.

The results produced by execution units 52 are saved in the register file, and/or stored in memory system 41. In some embodiments the memory system comprises a multi-level data cache that mediates between execution units 52 and memory 43. In the present example, the multi-level data cache comprises a Level-1 (L1) data cache 56 and L2 cache 42.

In some embodiments, the Load-Store Units (LSU) of processor 20 store data in memory system 41 when executing store instructions, and retrieve data from memory system 41 when executing load instructions. The data storage and/or retrieval operations may use the data cache (e.g., L1 cache 56 and L2 cache 42) for reducing memory access latency. In some embodiments, high-level cache (e.g., L2 cache) may be implemented, for example, as separate memory areas in the same physical memory, or simply share the same memory without fixed pre-allocation.

A branch/trace prediction module 60 predicts branches or flow-control traces (multiple branches in a single prediction), referred to herein as "traces" for brevity, that are expected to be traversed by the program code during execution by the various threads 24. Based on the predictions, branch/trace prediction module 60 instructs fetching modules 28 which new instructions are to be fetched from memory. As noted above, the instructions being fetched are divided by the control circuitry into groups of instructions referred to as segments, e.g., based on branch or trace prediction. Branch/trace prediction in this context may predict entire traces for segments or for portions of segments, or predict the outcome of individual branch instructions.

In some embodiments, processor 20 comprises a segment management module 64. Module 64 monitors the instructions that are being processed by the pipeline of processor 20, and constructs an invocation data structure, also referred to as an invocation database 68. Typically, segment management module 64 decides how to divide the stream of instructions being fetched into segments, e.g., when to terminate a current segment and start a new segment. In an example non-limiting embodiment, module 64 may identify a program loop or other repetitive region of the code, and define each repetition (e.g., each loop iteration) as a respective segment. Any other suitable form of partitioning into segments, not necessarily related to the repetitiveness of the code, can also be used.

Invocation database 68 divides the program code into traces, and specifies the relationships between them. Module 64 uses invocation database 68 for choosing segments of instructions to be processed, and instructing the pipeline to process them. Database 68 is typically stored in a suitable internal memory of the processor. The structure and usage of database 68 is described in detail in U.S. patent application Ser. No. 15/196,071, cited above.

Since fetching modules 28 fetch instructions according to branch/trace predictions, and according to traversal of invocation database 68, instructions are generally fetched out-of-order, i.e., in an order that differs from the sequential order of appearance of the instructions in the code.

Serving Multiple Hardware Threads Using a Multi-Bank BTB

In some embodiments described herein, processor 20 further comprises a multi-bank Branch-Target Buffer (BTB) 72. BTB 72 stores learned Target Addresses (TAs) of branch instructions. In the examples described herein, the TAs in BTB 72 are accessed by Program Counter (PC) value. Alternatively, the TAs in BTB 72 may be addressed/accessed in any other suitable way, for example by a subset of the PC bits or by Global History Register (GHR) value. Typically, when identifying a branch instruction having a fixed TA (or, in the case of GHR, a flow-control trace leading to a branch instruction), the processor creates a new entry in BTB 72, for later use.

Each entry in BTB 72 comprises a PC value of a branch instruction that was processed in the past by the processor pipeline and found to have a fixed TA, and the TA of that branch instruction. The term "Target Address" refers to the PC value of the next instruction to be processed if the branch is taken.

BTB 72 is typically queried by fetch modules 28. If the BTB has a matching entry, the PC can be set immediately to the next instruction to be fetched, without a need to wait until the branch instruction is decoded.

As will be explained below, the multi-bank structure of BTB 72 allows multiple hardware threads 24 to access the BTB in the same clock cycle with a very small probability of collision. In the present example, BTB 72 serves two hardware threads 24A and 24B. Generally, however, the disclosed techniques can be applied in a similar manner to serve a larger number of hardware threads.

In the present embodiment, BTB 72 can receive two PC values in a given clock cycle—PC0 from thread 24A and PC1 from thread 24B. BTB 72 provides four outputs per clock cycle: HIT0 (a signal indicating whether an entry for a branch instruction at PC0 exists in the BTB or not), TA0 (the TA of the branch instruction at PC0, if such an entry exists), HIT1 (a signal indicating whether an entry for a branch instruction at PC1 exists in the BTB or not), and TA1 (the TA of the branch instruction at PC1, if such an entry exists). In alternative embodiments, BTB 72 may be configured to receive any other suitable number of requests (and thus return any suitable number of TAs) per clock cycle.

Figure 2:
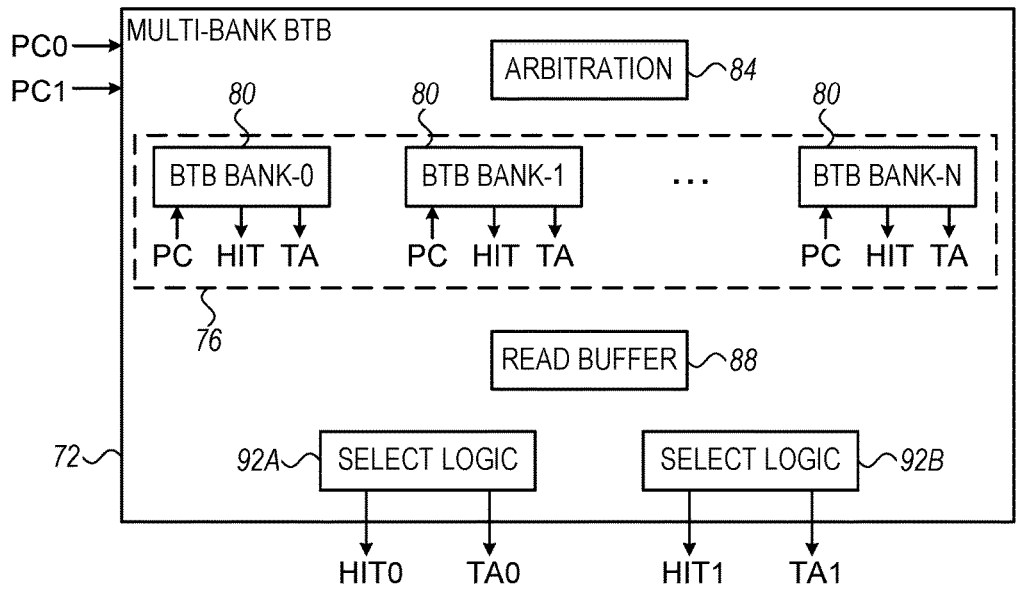
FIG. 2 is a block diagram that schematically illustrates a multi-bank BTB, in accordance with an embodiment of the present invention.

FIG. 2 is a block diagram that schematically illustrates the internal structure of multi-bank BTB 72, in accordance with an embodiment of the present invention. In the present example, BTB 72 comprises an array 76 of BTB banks 80 denoted BANK-0, . . . , BANK-N. Typically, both the array and its control are banked, to allow multiple simultaneous accesses. Each BTB bank 80 comprises a suitable memory, typically a single-port Random-Access Memory (RAM) that can be accessed (read or written) once per clock cycle. In alternative embodiments, BTB banks 80 may comprise any other suitable type of memory, e.g., dual-port RAM or Content-Addressable Memory (CAM).

Each BTB bank 80 stores multiple entries, each entry comprising a PC value of a previously-encountered branch instruction, and the learned TA of that branch instruction. Each BTB bank 80 receives a PC value as input, and returns a HIT output (indicating whether an entry for a branch instruction at this PC value exists in the BTB bank or not) and a TA output (the TA of the branch instruction, if such an entry exists).

In an example embodiment, array 76 comprises multiple BTB banks. Each BTB bank holds up to 2K entries, arranged in a set-associative manner with a Least-Recently Used (LRU) replacement policy. This configuration is given purely by way of example. In alternative embodiments, BTB 72 may comprise any other suitable number of BTB banks, of any suitable size and configuration.

Typically, each BTB bank is configured to store the TAs for a respective sub-range of PC values. In an example embodiment, each BTB bank 80 is organized as a Content-Addressable Memory (CAM). In order to look-up a PC value in BTB 72, one or more Lower-Significance Bits (LSBs) of the PC value are used for selecting the appropriate BTB bank 80 in array 76, and the remaining bits (or the entire PC value) used as a key or tag for accessing the selected BTB bank. If the selected BTB bank holds an entry for the PC value in question (the key or tag), the BTB bank returns the corresponding TA, and also asserts the HIT output. If not, the BTB bank de-asserts the HIT output. In other words, the BTB may be configured either as a fully-associative or as a set-associative CAM.

BTB 72 further comprises arbitration logic 84, and select logic 92A and 92B. Arbitration logic 84 arbitrates conflicts in access to BTB banks 80 using any kind of arbitration policy, e.g., Round Robin. Select logic 92A receives TAs that are retrieved from array 76 for thread 24A, outputs them as TA0, and asserts or de-asserts HIT0 as needed. Select logic 92B receives TAs that are retrieved from array 76 for thread 24B, outputs them as TA1, and asserts or de-asserts HIT1 as needed.

In a given clock cycle, BTB 72 may receive up to two queries for target addresses—PC0 from hardware thread 24A, and PC1 from hardware thread 24B. If PC0 and PC1 are mapped to different BTB banks 80, no collision occurs. The BTB bank corresponding to PC0 provides the TA requested by thread 24A (if one exists) to select logic 92A. In parallel, the (different) BTB bank corresponding to PC1 provides the TA requested by thread 24B (if one exists) to select logic 92B.

If, on the other hand, both PC0 and PC1 are mapped to the same BTB bank 80, a collision may occur, since each BTB bank can only be accessed once per clock cycle. In such a case, arbitration logic 84 chooses one of the two queries (either PC0 from thread 24A, or PC1 from thread 24B) to be served in the present clock cycle. The winning hardware thread is granted access to the BTB and is provided with the result. The other hardware thread is not served, and may be stalled until a later clock cycle.

When arbitrating between threads 24A and 24B, arbitration logic 84 may apply any suitable arbitration scheme, such as, for example, a Round-Robin scheme or other fairness-based scheme, or a scheme that gives priority to one hardware thread over the other.

In some practical scenarios, for example when hardware threads 24A and 24B process different iterations of the same program loop in parallel, there is high probability of collision between the two threads. Moreover, there is high likelihood that the two threads will not only access the same BTB bank, but will also query the same PC value. Such a scenario may persist for a relatively long time period.

In some embodiments, BTB 72 resolves the above scenario, as well as other possible undesired scenarios, by providing the TA requested by the winning thread to the other threads. In the present two-thread example, if thread 24A wins the arbitration, BTB 72 may provide PC0 and TA0 to both threads 24A and 24B. If thread 24B wins the arbitration, BTB 72 may provide PC1 and TA1 to both threads 24A and 24B. In this manner, if PC1 is relevant to the thread that lost the arbitration, it may continue processing and not stall.

In some embodiments, BTB 72 further comprises a read buffer 88, which caches recently-accessed BTB entries. By looking-up the read buffer, it is possible to further reduce the likelihood of collision in access to BTB banks 80, and/or resolve collisions as they occur. In an example embodiment, upon successfully accessing a certain entry (PC value and TA) in BTB banks 80, BTB 72 adds the entry to read buffer 88 (assuming there is free space in the buffer). The BTB may evict stale entries from read buffer 88 in accordance with any suitable policy, e.g., Least Recently Used (LRU) or Least Frequently Used (LFU) policy.

In one embodiment, when a certain thread loses the arbitration and cannot access BTB banks 80, BTB 72 instead attempts to find the requested TA in read buffer 88. If found, BTB 72 serves the request to the losing thread, i.e., provides the requested TA to the losing thread, from the read buffer instead of from the BTB banks. The requesting hardware thread may thus continue processing and not stall, even though it had lost the arbitration. In another embodiment, BTB 72 looks-up read buffer 88 before attempting to access BTB banks 80. Only if the requested TA is not found in the read buffer, BTB proceeds to try and access the BTB banks. In yet another embodiment, BTB looks-up read buffer 88 in parallel with, or slightly after, attempting to access BTB banks 80.

In addition to reducing the likelihood of collision, the use of buffer 88 also reduces power consumption, since access to the buffer typically consumes much less power than access to the BTB banks. The use of read buffer 88 is highly advantageous in scenario characterized by high probability of collision, e.g., when two threads execute the same loop. Nevertheless, read buffer 88 may improve performance in various other scenarios.

In some embodiments, both threads 24A and 24B process the same software thread. In other embodiments, threads 24A and 24B may process different software threads (i.e., different software programs, different code).

In some embodiments, a given hardware thread (24A or 24B) issues requests to BTB 72 only if the hardware thread is not stalled. In other words, in some embodiments stalled hardware threads do not access the BTB. In an embodiment, a thread will refrain from issuing requests to BTB 72 only if stalled for more than a predefined number of consecutive cycles. In other words, a stall of a single cycle (or a predefined small number of cycles) does not necessarily prevent a thread from competing for BTB access.

In some embodiments, even if a certain hardware thread is stalled, e.g., due to a data cache miss, it may still attempt to access BTB banks 80. In other words, arbitration and BTB access may still be performed for stalled hardware thread. If a stalled thread wins the arbitration, the thread may store the TA provided by BTB 72. Subsequently, e.g., when no longer stalled, the thread may access the stored TA instead of accessing BTB banks 80. The stalled thread may store the TA in any suitable location, e.g., in a separate buffer (not shown), or in read buffer 88. If the TA is stored in read buffer 88, the thread may store it along with a mark that prevents evicting this TA from the read buffer until the thread in question is no longer stalled and uses the TA. Arbitration logic 84 prevents the stalled hardware thread from participating in arbitration until at least one cycle after the stall is over. Once the stall is over, the thread retrieves the requested TA from its storage location, and therefore has no need to access the BTB banks in that cycle.

In an embodiment, in case of collision in access to the same BTB bank, arbitration logic 84 may give priority to a thread that is not stalled, over a thread that is stalled.

The configurations of processor 20 and of its various components, e.g., BTB 72, shown in FIGS. 1 and 2, are example configurations that are chosen purely for the sake of conceptual clarity. In alternative embodiments, any other suitable configurations can be used. For example, parallelization can be performed in any other suitable manner, or may be omitted altogether. The processor may be implemented without cache or with a different cache structure. The processor may comprise additional elements not shown in the figure. Further alternatively, the disclosed techniques can be carried out with processors having any other suitable micro-architecture. As another example, it is not mandatory that the processor perform register renaming.

As yet another example, the distinction among different hardware threads is not mandatory. In alternative embodiments, the pipeline of processor 20 may have any other suitable structure. BTB 72 may receive and process multiple requests per clock cycle from any elements of the pipeline.

Processor 20 can be implemented using any suitable hardware, such as using one or more Application-Specific Integrated Circuits (ASICs), Field-Programmable Gate Arrays (FPGAs) or other device types. Additionally or alternatively, certain elements of processor 20 can be implemented using software, or using a combination of hardware and software elements. The instruction and data cache memories, as well as BTB banks 80 and read buffer 88, can be implemented using any suitable type of memory, such as Random Access Memory (RAM).

Processor 20 may be programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Figure 3:
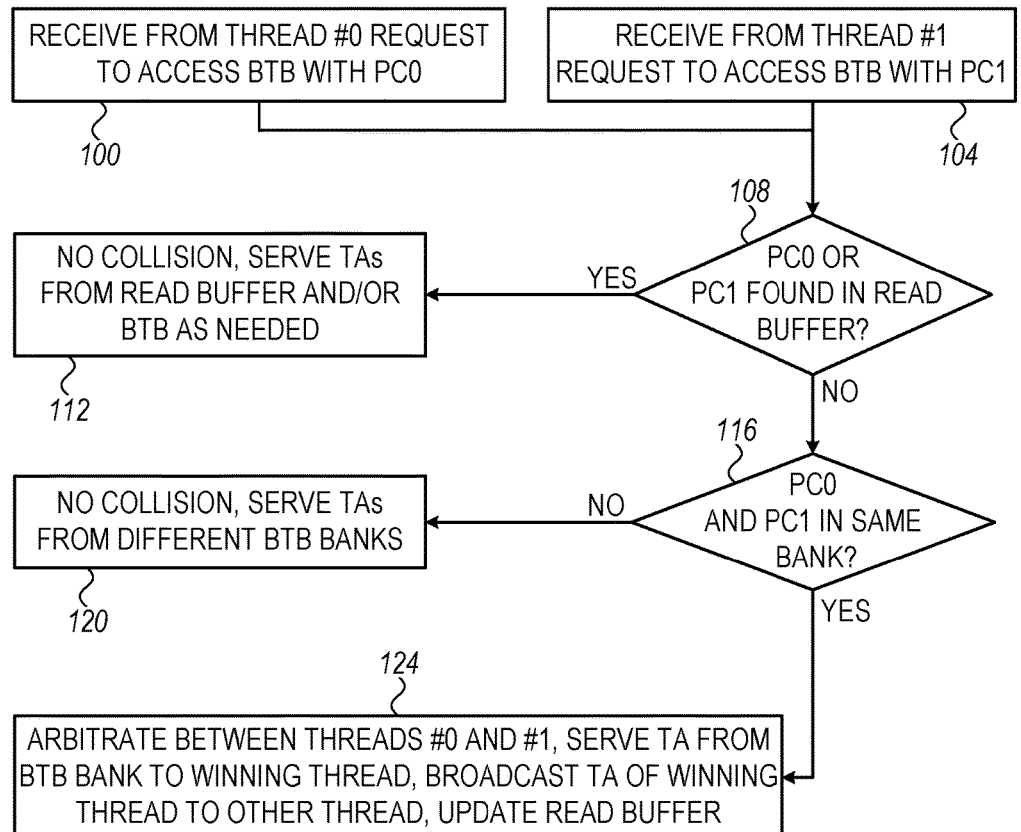
FIG. 3 is a flow chart that schematically illustrates a method for serving multiple hardware threads by a multi-bank BTB, in accordance with an embodiment of the present invention.

FIG. 3 is a flow chart that schematically illustrates a method for serving multiple hardware threads 24 by multi-bank BTB 72, in accordance with an embodiment of the present invention. The method begins with BTB 72 receiving a request from THREAD#0 for the TA corresponding to PC0, at a first request step 100, and a request from THREAD#1 for the TA corresponding to PC1, at a second request step 104.

At a buffer checking step 108, BTB 72 checks whether an entry corresponding to PC0 or to PC1 exists in read buffer 88. If so, no collision occurs. BTB 72 returns TA0 to THREAD#0, and TA1 to THREAD#1, at a first output step 112. The TAs may be served from read buffer 88 and/or from BTB banks 80, depending on where each TA is found.

If, on the other hand, PC0 and PC1 have no matching entries in read buffer 88, BTB 72 checks whether PC0 and PC1 are mapped to the same BTB bank 80 or to different BTB banks, at a bank checking step 116. If PC0 and PC1 are mapped to different BTB banks 80, again no collision occurs. In such a case, at a second output step 120, BTB 72 returns TA0 to THREAD#0 from one BTB bank 80, and returns TA1 to THREAD#1 from a different BTB bank 80.

If step 116 finds that both PC0 and PC1 are mapped to the same BTB bank 80, arbitration logic 84 arbitrates between the two requests, at an arbitration step 124. BTB 72 provides the requested TA to the winning thread from the BTB bank. Optionally, as described above, BTB 72 may multicast the TA to the losing thread, as well. BTB 72 may also update read buffer 88 with the accessed entry (PC and TA).

The method flow of FIG. 3 is an example flow that is depicted purely for the sake of clarity. In alternative embodiments, any other suitable method flow can be used. For example, the use of read buffer 88 and/or multicasting of the winning TA may be omitted.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A processor, comprising:
  a pipeline configured to process program instructions including branch instructions; and
  a multi-bank Branch-Target Buffer (BTB), which comprises a plurality of BTB banks and is configured to store learned Target Addresses (TAs) of one or more of the branch instructions in the plurality of the BTB banks, to receive from the pipeline simultaneous requests to retrieve respective TAs, and to respond to the requests using the plurality of the BTB banks in the same clock cycle,
  wherein the multi-bank BTB comprises a read buffer, which is configured to store one or more TAs that were previously retrieved from at least one of the BTB banks, and wherein the multi-bank BTB is configured to serve one or more of the requests from the read buffer instead of from the BTB banks.

2. The processor according to claim 1, wherein the pipeline comprises multiple hardware threads, and wherein the multi-bank BTB is configured to receive the simultaneous requests from two or more of the hardware threads.

3. The processor according to claim 1, wherein the multi-bank BTB is configured to attempt serving a request from the read buffer, in response to the request losing arbitration for access to the BTB banks.

4. The processor according to claim 1, wherein the multi-bank BTB is configured to initially attempt serving a request from the read buffer, and, in response to failing to serve the request from the read buffer, to serve the request from at least one of the BTB banks.

5. The processor according to claim 1, wherein the multi-bank BTB is configured to attempt serving a request from the read buffer, and, at least partially in parallel, to attempt serving the request from the BTB banks.

6. The processor according to claim 1, wherein a given hardware thread is configured to issue a request to the multi-bank BTB only if the given hardware thread is not stalled for more than a predefined number of clock cycles.

7. The processor according to claim 1, wherein, when a given hardware thread is stalled but nevertheless issues a request to the multi-bank BTB, the given hardware thread is configured to store a TA that was returned in response to the request, and to subsequently access the stored TA instead of accessing the BTB banks.

8. The processor according to claim 1, wherein, when a given hardware thread is stalled, the given hardware thread is configured to delay access to the multi-bank BTB.

9. A processor, comprising:
  a pipeline configured to process program instructions including branch instructions; and
  a multi-bank Branch-Target Buffer (BTB), which comprises a plurality of BTB banks and is configured to store learned Target Addresses (TAs) of one or more of the branch instructions in the plurality of the BTB banks, to receive from the pipeline simultaneous requests to retrieve respective TAs, and to respond to the requests using the plurality of the BTB banks in the same clock cycle,
  wherein the multi-bank BTB is configured to:
  detect that two or more of the requests pertain to the same BTB bank;
  arbitrate between the requests that access the same BTB bank, so as to select a winning request;
  retrieve a TA from the same BTB bank in response to the winning request; and
  provide the retrieved TA to a hardware thread that issued the winning request.

10. The processor according to claim 9, wherein the multi-bank BTB is configured to multicast the retrieved TA to the hardware thread that issued the winning request, and to at least one other hardware thread that did not issue the winning request.

11. The processor according to claim 10, wherein the requests that access the same BTB bank pertain to at least two different software threads.

12. A method, comprising:
  in a processor, processing program instructions, including branch instructions, using a pipeline;
  storing learned Target Addresses (TAs) of one or more of the branch instructions in a multi-bank Branch-Target Buffer (BTB) that comprises a plurality of BTB banks;
  receiving from the pipeline simultaneous requests to retrieve respective TAs; and
  responding to the requests using the plurality of the BTB banks in the same clock cycle,
  wherein storing the learned TAs comprises storing, in a read buffer, one or more TAs that were previously retrieved from at least one of the BTB banks, and wherein responding to the requests comprises serving one or more of the requests from the read buffer instead of from the BTB banks.

13. The method according to claim 12, wherein receiving the simultaneous requests comprises accepting the simultaneous requests from two or more hardware threads of the pipeline.

14. The method according to claim 12, wherein responding to the requests comprises:
- detecting that two or more of the requests pertain to the same BTB bank;
- arbitrating between the requests that access the same BTB bank, so as to select a winning request;
- retrieving a TA from the same BTB bank in response to the winning request; and
- providing the retrieved TA to a hardware thread that issued the winning request.

15. The method according to claim 14, wherein providing the retrieved TA comprises multicasting the retrieved TA to the hardware thread that issued the winning request, and to at least one other hardware thread that did not issue the winning request.

16. The method according to claim 15, wherein the requests that access the same BTB bank pertain to at least two different software threads.

17. The method according to claim 12, wherein responding to the requests comprises attempting to serve a request from the read buffer, in response to the request losing arbitration for access to the BTB banks.

18. The method according to claim 12, wherein responding to the requests comprises initially attempting to serve a request from the read buffer, and, in response to failing to serve the request from the read buffer, serving the request from at least one of the BTB banks.

19. The method according to claim 12, wherein responding to the requests comprises attempting to serve a request from the read buffer, and, at least partially in parallel, attempting to serve the request from the BTB banks.

20. The method according to claim 12, and comprising issuing a request to the multi-bank BTB by a given hardware thread only if the given hardware thread is not stalled for more than a predefined number of clock cycles.

21. The method according to claim 12, and comprising, when a given hardware thread is stalled but nevertheless issues a request to the multi-bank BTB, storing, by the given hardware thread, a TA that was returned in response to the request, and subsequently accessing the stored TA instead of accessing the BTB banks.

22. The method according to claim 12, and comprising, when a given hardware thread is stalled, delaying access to the multi-bank BTB by the given hardware thread.

* * * * *